… [11] 3,599,552

| [72] | Inventor | Donald M. Harvey |
| --- | --- | --- |
| | | Webster, N.Y. |
| [21] | Appl. No. | 853,093 |
| [22] | Filed | Aug. 26, 1969 |
| [45] | Patented | Aug. 17, 1971 |
| [73] | Assignee | Eastman Kodak Company |
| | | Rochester, N.Y. |

[54] AUTOMATIC FOCUSING DEVICE
8 Claims, 7 Drawing Figs.

[52] U.S. Cl............................................. 95/44 C,
 95/45, 250/201
[51] Int. Cl............................................. G03b 3/00
[50] Field of Search............................................. 95/44 R, 44
 C, 45; 250/201

[56] References Cited
UNITED STATES PATENTS

| 3,443,502 | 5/1969 | Harvey........................... | 95/44 R |
| 3,450,018 | 6/1969 | John, Jr......................... | 95/45 |

*Primary Examiner*—Samuel S. Matthews
*Assistant Examiner*—E. M. Bero
*Attorneys*—Robert W. Hampton and William C. Dixon, III ABSTRACT: A camera having an electrical power supply, a light emitting shutter, an objective lens, and apparatus for automatic focusing having first and second lenses. Modulated radiant energy of predetermined frequency is transmitted through the first lens toward the subject. The reflected image from the subject is passed by the second lens and received by a light sensitive transducer. The energy emitting source and the light sensitive transducer are displaced in unison to vary the modulated radiant energy reflected from the subject. Electronic detection circuitry is coupled to the light sensitive transducer to develop an output signal when the modulated radiant energy incident on the light sensitive transducer is at a maximum. The output signal is applied to arrest further displacement of the energy emitting source and the light sensitive transducer. The objective lens is moved toward a position that is determined by the displacement of the energy emitting source and the light sensitive transducer.

PATENTED AUG 17 1971 3,599,552

DONALD M. HARVEY
INVENTOR.

BY *William C. Oxon, III*
*Robert W. Hampton*
ATTORNEYS

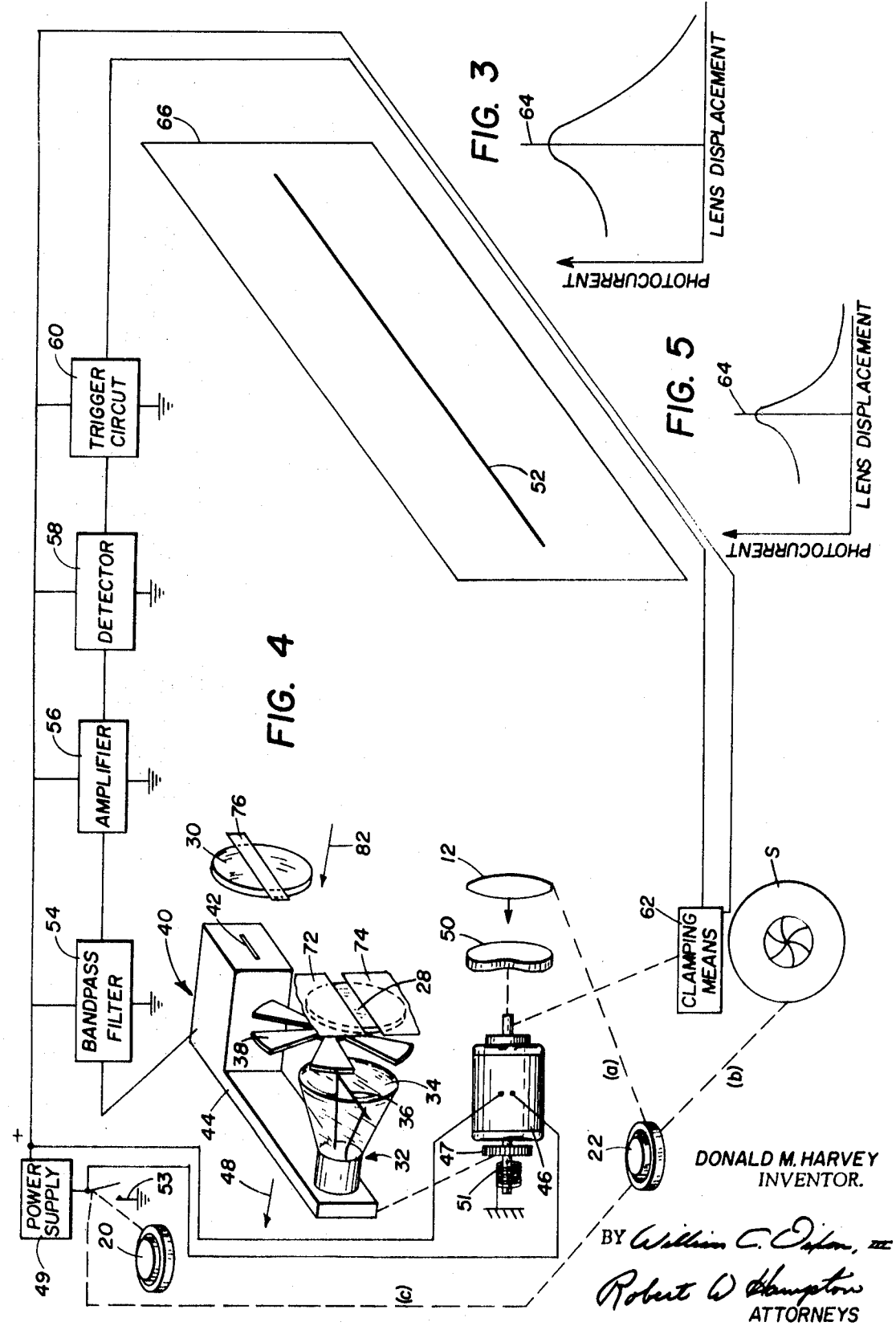

AUTOMATIC FOCUSING DEVICE

BACKGROUND OF THE INVENTION

1. Field of the Invention

This invention relates to an automatic focusing and range finder mechanism suitable for use in a camera or the like.

2. Description of the Prior Art

It is broadly known in the prior art to use reflected light from a subject for the purpose of determining range distance. One of the major difficulties in the art has been to effectively use the reflected signal so as to precisely determine when true focus occurs.

SUMMARY OF THE INVENTION

The invention relates to an apparatus for determining the range distance to a subject of interest. In one disclosed embodiment of the invention, energy emitting means are provided for transmitting modulated radiant energy of predetermined frequency through a first lens toward the subject. The reflected image from the subject is received by a second lens and passed to a light sensitive means. Displacement means are adapted to move the energy emitting means and the light sensitive means in unison to vary the modulated radiant energy reflected from the subject. Means are coupled to the light sensitive means for developing an output signal wen the modulated radiant energy incident on the light sensitive means is at a maximum.

In another embodiment, the first and second lenses are masked so as to exaggerate out of focus conditions to enable easier detection of the maximum modulated radiant energy incident on the light sensitive means.

It is an object of the instant invention to provide an automatic mechanism which will quickly and accurately enable the determination of distance without elaborate manual manipulation being required.

Other objects and advantages will become apparent from the following description taken in connection with the accompanying drawings.

BRIEF DESCRIPTION OF THE DRAWINGS

FIG. 3 is a wave form diagram of photocurrent vs. lens displacement used in explaining the operation of the embodiment of FIG. 2;

FIG. 4 is a schematic diagram showing a second illustrative embodiment of the instant invention;

FIG. 5 is a wave form diagram of photocurrent vs. lens displacement used in explaining the operation of the embodiment of FIG. 4.

DESCRIPTION OF THE PREFERRED EMBODIMENT

The invention is here illustrated in conjunction with a still camera, but it should of course be understood that the inventive concept is equally useful in any apparatus where automatic focus and range findings are required to be accomplished.

Figure 1:
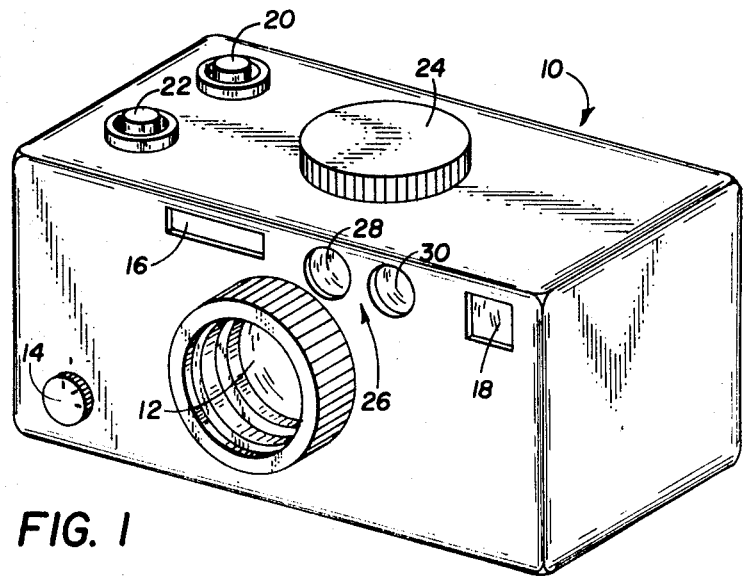
FIG. 1 is a pictorial view of a still camera utilizing an automatic focus and range finding mechanism in accordance with the invention.

Referring now to FIG. 1, a still camera is indicated generally at 10. The camera 10 includes: an objective lens indicated at 12, a shutter setting dial 14, a photometric detector 16, a view finder 18, a range and focus mechanism release member 20, a shutter release member 22, and a winding advance member 24. In accordance with the invention, the camera also includes a focus and range determining mechanism indicated generally at 26 in FIG. 1; lenses 28, 30 shown in FIG. are associated with this mechanism and shall later be described in greater detail.

Figure 2:
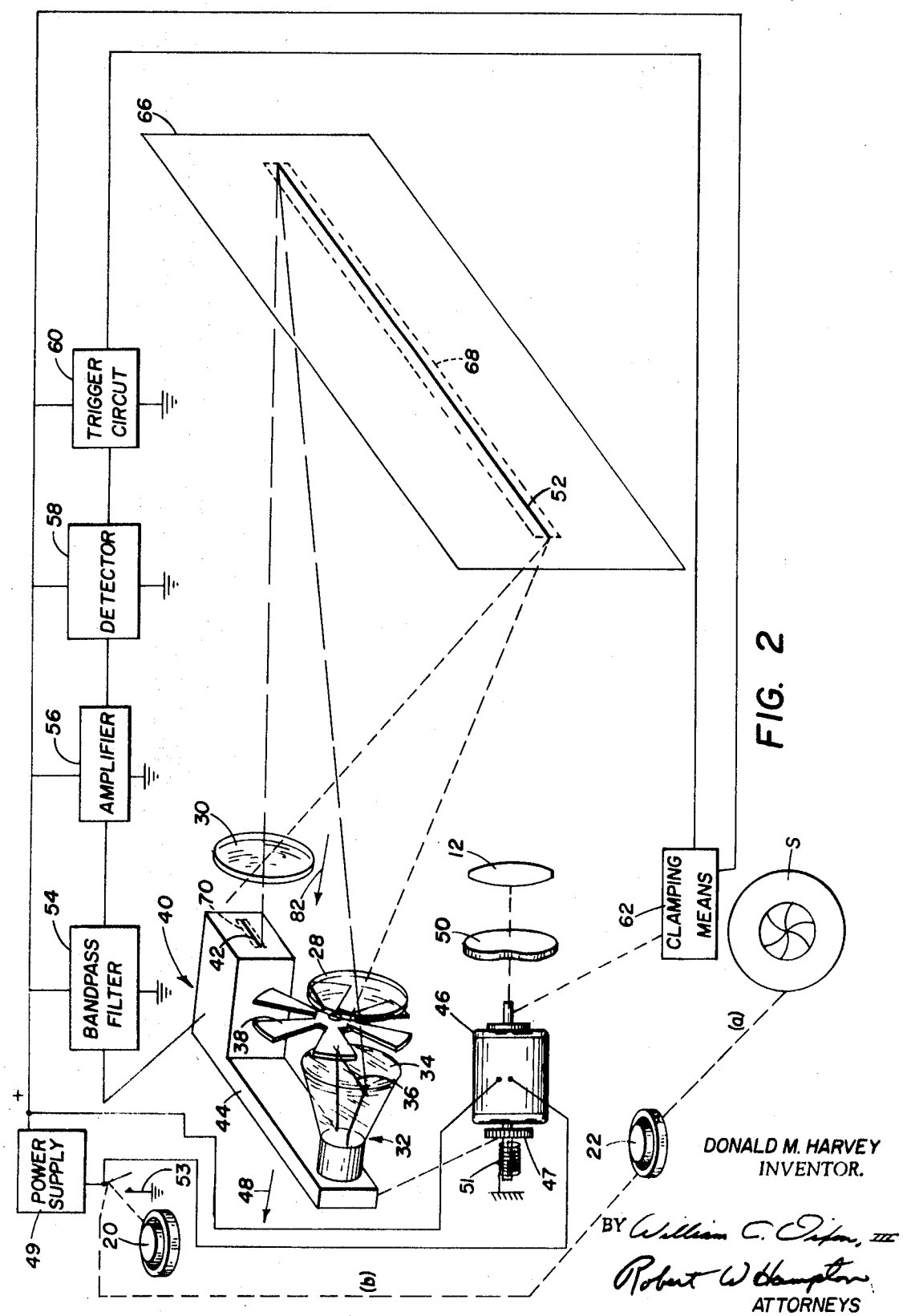
FIG. 2 is a schematic diagram showing the automatic focus and range finding mechanism in accordance with one illustrative embodiment of the instant invention.

One embodiment of the automatic focus and range determining mechanism of the instant invention is illustrated in FIG. 2. A source of modulated radiation is indicated generally at 32, and in this particular embodiment may conveniently comprise an incandescent lamp 34 having a straight line filament 36. The radiant energy emitted by the lamp 34 is modulated in any convenient manner such as by a mechanical chopper indicated at 38 and suitable driven by a prime mover source (not shown) to provide a predetermined modulated frequency.

A photosensitive transducer means, indicated generally at 40, comprises a photosensitive cell 42. While the radiation source 32 and the transducer 40 may be conveniently arranged in a housing 44, they may also be independently supported. As will be seen as the description proceeds, the radiation source 32 and the photosensitive transducer means 40 are moved in unison. An electric motor 46 is mechanically coupled to the housing 44, as indicated symbolically at 47, so as to move the modulated radiation source 32 and the photosensitive transducer means 40 in the direction indicated by the arrow at 48. The motor 46 is energized by power supply 49, when the release member 20 is actuated to close switch 53, and is arranged to be displaced through a predetermined rotational displacement based on the total distance housing 44 is to be moved, i.e., from the near hyperfocal setting for the objective lens 12 of the camera. The motor 46 is biased by s pring means 51 to return to its initial position after the motor shaft is unclamped, as will be explained when the operation of the FIG. 2 embodiment is discussed in greater detail. A range determining cam means 50, having a cam surface which is a function of range distance, is coupled, as indicated by the dashed line, for rotational displacement with the motor shaft. The objective lens 12 in this embodiment is coupled directly to the cam means 50 by means (not shown) which include a follower to engage the contoured surface of cam means 50. As the cam 50 rotates, the objective lens 12 is successively moved through various focal setting until displacement is arrested at true focus for the subject.

The light from the straight line filament 36, after modulation by the chopper 38, is projected toward a subject, indicated here symbolically by a planar surface identified at 66, to produce an image at 52 which is reflected to and received by the lens 30 and imaged on the photocell exposed slot surface 42.

The electrical output of the photosensitive transducer means 40 is electrically coupled to a band pass filter means 54, and then successively passed to an amplifier means 56, a peak detector means 58, and a trigger circuit means 60. The output signal of the trigger circuit 60 is applied to a clamping means 62.

Completing the description of FIG. 2, the shutter release member 22 is adapted to open switch 53, and is coupled to a shutter indicated symbolically at S, as will be later explained.

OPERATION OF THE PREFERRED EMBODIMENT

In operation of the camera, the operator observes a subject 66 through the view finder 18 (FIG. 1), and the focus determining release member 20 is depressed close switch 53 to energize the electric motor 46 and the circuitry at 54, 56, 58, 60 and 62. Switch 53 is arranged to remain closed after release of member 20 and to be subsequently opened by operation of the shutter release member 22. The rotation of the motor 46 causes the housing 44 to be displaced in the direction indicated by the arrow 48.

Referring now especially to FIG. 2, when the filament is in true focus on the subject 66, the line filament will be imaged at 52. In any other position either side of true focus, the filament imaged on the subject 66 will be enlarged as indicated in dotted outline at 68. The enlarged image will therefore be reflected as an enlarged image on the photocell exposed slot 42 as indicated at 70.

In FIG. 3 there is a curve depicting photocurrent as ordinate and lens displacement as abscissa. When the line filament 36 is in true focus on the subject 66, maximum photocurrent will obtain as indicated by the ordinate at 64. In any other position a smaller photocurrent will result. When, for example, the photocell receives the image indicated at 70, a smaller photocurrent will be obtained because the photosensitive surface is receiving less radiant energy.

The light transmitted from the source of radiation 32 is modulated by the mechanical chopper 38; the signal reflected to the photocell surface 42 is thus also modulated. The band pass filter 54 is arranged to pass a band frequency including the predetermined frequency such as, for example, 2.5 kilo Hz. The modulated photocurrent from the photosensitive transducer means 40 is passed to the band pass filter 54, which attenuates other frequencies outside the band. The filtered output is passed to amplifier 56 and then to a peak detector 58 which, when the maximum signal is detected, sends an output to the trigger circuit means 60 which sends a trigger signal to the clamping means 62, which may include solenoids energized in response to said trigger signal to hold the motor shaft against further rotation. The range determining cam 50, which is mounted on the motor shaft, then comes to rest, and since the objective lens 12 is in contiguous contact with the cam 50, the object lens 12 is now in correct focus with respect to the subject 66.

The objective lens 12 of the camera 10 is now in focus, and the camera user depresses the shutter release member 22, which first permits light to enter the camera through the objective lens 12 for actual picture taking, and then opens switch 53 to disconnect the power supply 49 to thereby deenergize the circuitry 54, 56, 58, 60, 62 as well as the motor 46. Next, the spring means 51 rotates motor 46 to return the housing 44 to its initial position.

DESCRIPTION OF AN ALTERNATIVE EMBODIMENT

An alternative embodiment of the automatic focus and range finding mechanism is shown in FIG. 4. As may be seen from a study of FIG. 3, the peak photocurrent at ordinate 64 has a modestly rounded configuration, so that detection of the maximum is somewhat difficult as the peak is approached. It would be helpful in some applications to have a maximum peak that would be much sharper to make for easier and more accurate detection. The embodiment of FIG. 4 is intended to provide a photocurrent vs. lens displacement curve similar to that depicted in FIG. 5, where, with the same radiation source 32, a somewhat sharper peak obtains, although with some sacrifice in the signal amplitude. As will be understood presently, it is preferably to sacrifice the diminution in signal magnitude in order to provide for easier peak detection. (If one desires that there be no loss of signal amplitude, then one need only increase the magnitude of the radiation source 32.)

Referring now especially to FIG. 4, where the same numeration has been retained in identifying similar parts, the lends 28 is partially covered by masking members 72, 74, and the lens 30 contains a masking element 76 positioned on its optical axis.

Figure 6:
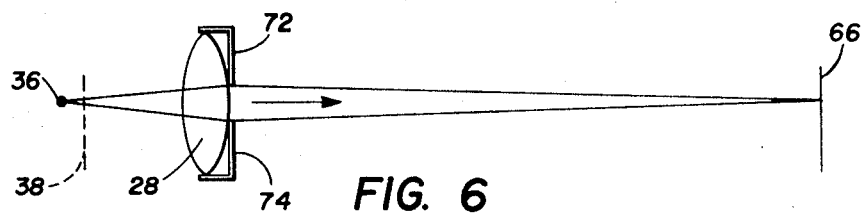
FIGS. 6 and 7 are explanatory schematic diagrams of certain components found in the embodiment of FIG. 4.
Figure 7:
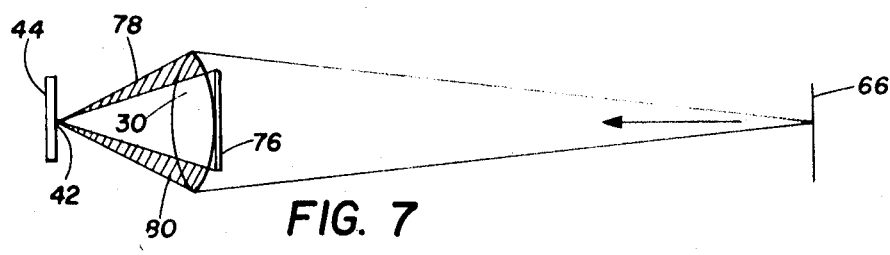

This arrangement of the lenses 28, 30 may best be appreciated from a study of FIGS. 6 and 7. The use of the masking means 72, 74 (FIG. 6) narrows the width of light beam being sent out from the source of radiation 32 towards the subject 66. As shown in FIG. 7, the reflected energy from the subject 66 is then passed through the lens 30, which, because of the mask 76, refracts the received light in a pattern having the general configuration of a centrally hollowed cone, as indicated by cross section at 78, 80.

In both the FIG. 2 and FIG. 4 embodiments the lens 12 may be either displaced concurrently with the cam 50 or the lends may be later moved toward the stop afforded by the arrested cam 50 prior to the picture taking.

In the FIG. 4 embodiment, the lens 12 is not displaced concurrently with the cam 50; instead, objective leans 12 is arranged to be displaced toward the cam surface of cam 50 upon actuation by the shutter release member 22. This may be accomplished in one convenient manner by biasing the lens 12 in the direction of the cam surface of cam 50, the lens 12 being held out of contact with the cam surface by any suitable latching means. Depressing shutter member 22, then, releases the latch and the lens 12 moves into the position defined by the arrested cam means 50.

OPERATION OF THE ALTERNATIVE EMBODIMENT

The operation of the device is substantially the same as previously described in connection with FIG. 2. As before, the camera user depresses the range and focus determining member 20 to energize the motor 46 and the circuitry; the housing 44 supporting the radiation source-photosensitive transducer 32—40 is then displaced in the direction 48. The modulated light received by the lens 30 is passed to the photosensitive transducer 40 in the form of a centrally hollowed cone, as indicated by the cross hatching 78, 80 in FIG. 7. The maximum light falls on the photocell surface 42 when the filament image 36 is in true focus. At any point on either side of true focus, the refracted light pattern of the centrally hollowed cone exaggerates the out of focus condition so that substantially less light falls on the photocell surface 42, resulting in the sharper peak depicted in FIG. 5.

Peak detection is accomplished as described in connection with the embodiment of FIG. 2, and when the true range has been determined, the camera user depresses the shutter member 22, which first: (a) causes objective lens 12 to be displaced toward the stop afforded by the arrested cam 50, then (b) actuates the shutter S, and finally (c) opens switch 53 to deenergize the motor 46 and the circuitry. The motor 46 under the discipline of the spring means 51 returns to the rest position, as does the housing 44.

As viewed in the direction indicated by the arrow 82 (FIGS. 2 and 4) on the frontal plane orthographic projection the height dimensions of the wire filament 36 and the photoemissive surface of the photosensitive transducer means are defined as $h1$ and $h2$ respectively. (The diameter dimension of the wire filament 36 is equal to $h1$.) The lenses 28 and 30 have focal lengths $f1$ and $f2$ respectively. The focal lengths $f1$ and $f2$ and the heights $h1$ and $h2$ are in inverse proportion. Stated mathematically:

$$f1/f2 = h2/f1$$

It should be noted that the above equation holds true for equal focus lengths $f1$ and $f2$ since this produces a ratio equal to unity.

The invention has been described in detail with particular reference to the illustrated embodiments thereof, but it will be understood that variations and modifications can be effected within the spirit and scope of the invention.

I claim:

1. A camera having an electrical power supply, a light admitting shutter, and apparatus for determining the distance to a subject of interest, comprising:
    a. a first lens;
    b. a second lens;
    c. means for emitting modulated radiant energy of predetermined frequency through said first lens toward the subject;
    d. light sensitive means for receiving through said second lens modulated energy reflected from the subject;
    e. means adapted to be energized by the electrical power supply for displacing said energy emitting means and said light sensitive means in unison to vary the modulated radiant energy reflected from the subject;
    f. electronic detection means, coupled to said light sensitive means and adapted to be energized by the electrical power supply, for developing an output signal when the modulated radiant energy received by said light sensitive means is at a maximum;
    g. utilization means for utilizing said output signal to arrest displacement of said energy emitting means and said light sensitive means;

h. first means for connecting the electrical power supply to said displacing means and said electronic detection means; and i. second means for sequentially operating the light admitting shutter and disconnecting the electrical power supply from said displacing means and said electronic detection means.

2. A camera having an electrical power supply, a light admitting shutter, an objective lens, and apparatus for determining the distance to a subject of interest, comprising:
   a. a first lens;
   b. a second lens;
   c. means for emitting modulated radiant energy of predetermined frequency through said first lens towards the subject;
   d. light sensitive means for receiving through said second lens modulated radiant energy reflected from the subject;
   e. means adapted to be energized by the electrical power supply for displacing said energy emitting means and said light sensitive means in unison to vary the modulated radiant energy reflected from the subject;
   f. electronic detection means, coupled to said light sensitive means and adapted to be energized by the electrical power supply, for developing an output signal when the modulated radiant energy received by said light sensitive means is at a maximum level;
   g. utilization means for utilizing said output signal to arrest displacement of said energy emitting means and said light sensitive means at a locus indicative of said maximum level of received energy;
   h. first means for connecting the electrical power supply to said displacing means and said electronic detection means; and
   i. second means for sequentially moving the objective lens toward a focus position that is a function of said locus, operating the light admitting shutter, and disconnecting the electrical power supply from said displacement means and said electronic detection means.

3. A camera having an electrical power supply, a light admitting shutter, and apparatus for determining the distance to a subject of interest, comprising:
   a. a first lends having a first focal length;
   b. a second lens having a second focal length;
   c. means comprising a radiation surface having an effective height $h1$ in frontal plane orthographic orientation for emitting modulated radiant energy through said first lens toward the subject;
   d. light sensitive means comprising a light sensitive surface having a height $h2$ in said frontal plane orthographic orientation, said heights $h1$ and $h2$ being in inverse proportion to said first and second focal lengths, said light sensitive means receiving through said second lens, modulated radiant energy reflected from the subject;
   e. means adapted to be energized by the electrical power supply for displacing the said energy emitting means and said light sensitive means in unison to vary the modulated radiant energy reflected from the subject;
   f. electronic detection means, coupled to said light sensitive means and adapted to be energized by the electrical power supply, for developing an output signal when the modulated radiant energy received by said light sensitive means is at a maximum level;
   g. utilization means for utilizing said output signal to arrest displacement of said energy emitting means and said light sensitive means at a locus indicative of said maximum level of received energy;
   h. first means for connecting the electrical power supply to said displacing means and said electronic detection means; and
   i. second means for sequentially operating the light admitting shutter and disconnecting the electrical power supply from said displacing means and said electronic detection means.

4. A camera having an electrical power supply, a light admitting shutter, an objective lens, and apparatus for determining the distance to a subject of interest, comprising;
   a. a first lens having a first focal length;
   b. a second lens having a second focal length;
   c. means comprising a radiation surface having an effective height $h1$ in frontal plane orthographic orientation for emitting modulated radiant energy through said first lens towards the subject;
   d. light sensitive means comprising a light sensitive surface having a height $h2$ in said frontal plane orthographic orientation, said heights $h1$ and $h2$ being in inverse proportion to said first and second focal lengths, said light sensitive means receiving through said second lens modulated radiant energy reflected from the subject;
   e. means adapted to be energized by the electrical power supply for displacing said energy emitting means and said light sensitive means in unison to vary the modulated radiant energy reflected from the subject;
   f. electronic detection means, coupled to said light sensitive means and adapted to be energized by the electrical power supply, for developing an output signal when the modulated radiant energy received by said light sensitive means is at a maximum level;
   g. utilization means for utilizing said output signal to arrest displacement of said energy emitting means and said light sensitive means at a locus indicative of said maximum level of received energy;
   h. first means for connecting the electrical power supply to said displacing means and said electronic detection means; and
   i. second means for sequentially moving the objective lens toward a focus position that is a function of said locus, operating the light admitting shutter, and disconnecting the electrical power supply from said displacing means and said electronic detection means.

5. A camera having an electrical power supply, a light admitting shutter, and apparatus for determining the distance to a subject of interest, comprising:
   a. a first lens;
   b. first means for masking said first lens to provide a collimated transmission path;
   c. a second lens;
   d. second means for masking said second lens to provide predetermined ingress;
   e. means for emitting modulated radiant energy of predetermined frequency through said first lens toward the subject;
   f. light sensitive means for receiving through said second lens modulated radiant energy reflected from the subject;
   g. means adapted to be energized by the electrical power supply for displacing said energy emitting means and said light sensitive means in unison to vary the modulated radiant energy reflected from the subject;
   h. electronic detection means, coupled to said light sensitive means and adapted to be energized by the electrical power supply, for developing an output signal when the modulated radiant energy received by said light sensitive means is at a maximum level;
   i. utilization means for utilizing said output signal to arrest displacement of said energy emitting means and said light sensitive means at a locus indicative of said maximum level of received energy;
   j. first means for connecting the electrical power supply to said displacing means and said electronic detection means; and
   k. second means for sequentially operating the light admitting shutter and disconnecting the electrical power supply from said displacing means and said electronic detection means.

6. A camera having an electrical power supply, a light admitting shutter, an objective lens, and apparatus for determining the distance to a subject of interest, comprising:
   a. a first lens;

b. first means for masking said first lens to provide a collimated transmission path;
c. a second lens;
d. second means for masking said second lens to provide a predetermined ingress;
e. means for emitting modulated radiant energy of predetermined frequency through said first lens toward the subject;
f. light sensitive means for receiving through said second lens modulated radiant energy reflected from the subject;
g. means adapted to be energized by the electrical power supply for displacing said energy emitting means and said light sensitive means in unison to vary the modulated radiant energy reflected from the subject;
h. electronic detection means, coupled to said light sensitive means and adapted to be energized by the electrical power supply, for developing an output signal when the modulated radiant energy received by said light sensitive means is at a maximum level;
i. utilization means for utilizing said output signal to arrest displacement of said energy emitting means and said light sensitive means at a locus indicative of said maximum level of received energy;
j. first means for connecting the electrical power supply to said displacing means and said electrical detection means; and
k. second means for sequentially moving the objective lens toward a focus position that is a function of said locus, operating the light admitting shutter; and disconnecting the electrical power supply from said displacing means and said electronic detection means.

7. A camera having an electrical power supply, a light admitting shutter, and apparatus for determining the distance to a subject of interest, comprising:
a. a first lens having a first focal length;
b. first means for masking said first lens to provide a collimated transmission path;
c. a second lens having a second focal length;
d. second means for masking said second lens to provide a predetermined ingress;
e. means comprising a radiation surface having an effective height $h1$ in frontal plane orthographic orientation for emitting modulated radiant energy through said first lens toward the subject;
f. light sensitive means comprising a light sensitive surface having a height $h2$ in said frontal plane orthographic orientation, said heights $h1$ and $h2$ being in inverse proportion to said first and second focal lengths, said light sensitive means receiving through said second lens modulated radiant energy reflected from the subject;
g. means adapted to be energized by the electrical power supply for displacing said energy emitting means and said light sensitive means in unison to vary the modulated radiant energy reflected from the subject;
h. electronic detection means, coupled to said light sensitive means and adapted to be energized by the electrical power supply, for developing an output signal when the modulated radiant energy received by said light sensitive means is at a maximum level;
i. utilization means for utilizing said output signal to arrest displacement of said energy emitting means and said light sensitive means at a locus indicative of said maximum level of received energy;
j. first means for connecting the electrical power supply to said displacing means and said electronic detection means; and
k. second means for sequentially operating the light admitting shutter and disconnecting the electrical power supply from said displacing means and said electronic detection means.

8. A camera having an electrical power supply, a light admitting shutter, an objective lens, and apparatus for determining the distance to a subject of interest, comprising:
a. a first lens having a first focal length;
b. first means for masking said first lens to provide a collimated transmission path;
c. a second lens having a second focal length;
d. second means for masking said second lens to provide predetermined ingress;
e. means comprising a radiation surface having an effective height $h1$ in frontal plane orthographic orientation for emitting modulated radiant energy through said first lens toward the subject;
f. light sensitive means comprising a light sensitive surface having a height $h2$ in said frontal plane orthographic orientation, said heights $h1$ and $h2$ being in inverse proportion to said first and second focal lengths, said light sensitive means receiving through said second lens modulated radiant energy reflected from the subject;
g. means adapted to be energized by the electrical power supply for displacing said energy emitting means and said light sensitive means in unison to vary the modulated radiant energy reflected from the subject;
h. electronic detection means, coupled to said light sensitive means and adapted to be energized by the electrical power supply, for developing an output signal when the modulated radiant energy received by said light sensitive means is at a maximum level;
i. utilization means for utilizing said output signal to arrest displacement of said energy emitting means and said light sensitive means at a locus indicative of said maximum level of received energy;
j. first means for connecting the electrical power supply to said displacing means and said electronic detection means; and
k. second means for sequentially moving the objective lens toward a focus position that is a function of said locus, operating the light admitting shutter, and disconnecting the electrical power supply from said displacing means and said electronic detection means.